J. KELSEY.
Harrow.
No. 37,234. Patented Dec. 23. 1862.
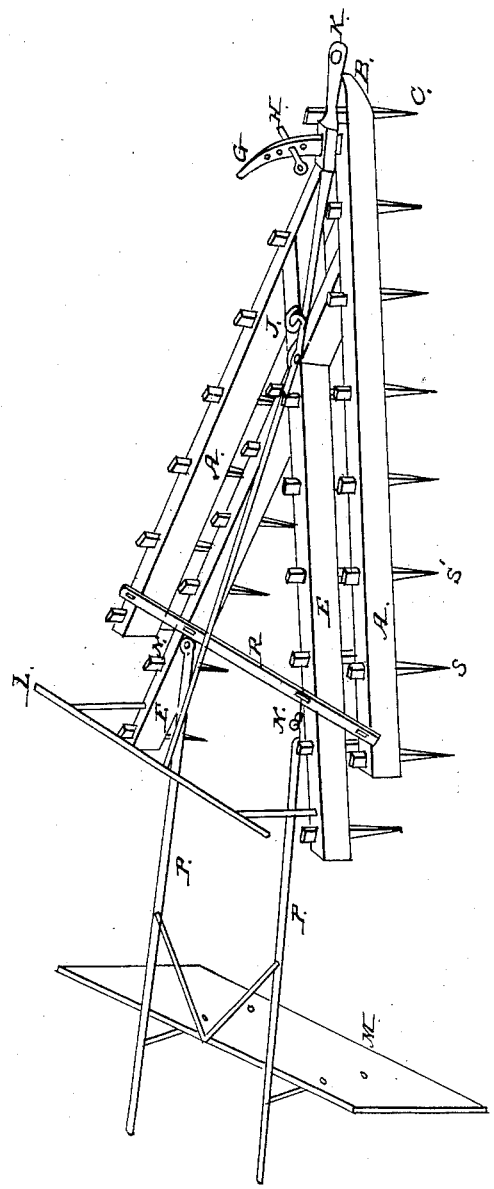

UNITED STATES PATENT OFFICE.

JOHN KELSEY, OF YARDLEYVILLE, PENNSYLVANIA.

IMPROVEMENT IN HARROWS.

Specification forming part of Letters Patent No. 37,234, dated December 23, 1862.

*To all whom it may concern:*

Be it known that I, JOHN KELSEY, of Yardleyville, Bucks county, State of Pennsylvania, have invented new and useful Improvements in Double V-Shaped Harrows; and I do hereby declare that the following is a full and exact description thereof, reference being had to the accompanying drawing, and to the letters of reference marked thereon, making a part of this specification.

The nature of my invention consists in the construction of the frame and the devices of draft-iron, arranged in combination with a scraper in the rear of harrow.

To enable others skilled in the art to make and use my invention, I will proceed to describe its construction and operation.

A represents a V-shaped frame, with its one side, B, extending about nine inches beyond the opposite side, and forming an oblique extended point, B, with a front tooth, C, which throws off the dirt or anything that would clog the harrow—a decided advantage over the tooth as usually fixed in front on a line with the center of the machine at the point of harrow, as heretofore.

E represents another V-shaped frame on the inside, parallel with the outside frame, A, and fastened to the outside by mortise and tenon, forming a diamond-shaped front.

G is the bearing-point, located behind the front. It is of bar iron, curved backward, and contains apertures and pin H to regulate the draft and keep the harrow in a level position. A connecting-rod, J, is attached to the hitching iron or point K, through which the bar G passes, and to the cross-handle L, which, by pressing upon the cross-handle L, raises the harrow, and a perfect government and management of the harrow is maintained without the labor usually attending the regulation of the course of the harrow.

The scraper M is an oblong-shaped and straight scraper, made of wood or iron, which operates vertically, and is for the purpose of smoothing and making even the harrowed ground, to prevent water from collecting in pools on the surface and render the ground by one operation more fit for the mowing-machine afterward. It is intended to be attached or detached (as required) by hooks and eyes N of handle P and the cross-beam R, which is fastened to frame A. The teeth S are set at equidistances apart in the frame A and E.

What I claim as my invention, and desire to secure by Letters Patent, is—

The construction of the oblique extended point B, with its front tooth, C, and the scraper M, when arranged and combined with the harrow, as herein described, and for the purposes herein set forth.

JNO. KELSEY.

Witnesses:
J. FRANKLIN REIGART,
JOHN S. HOLLINGSHEAD.